United States Patent [19]

Thomson

[11] 3,862,400

[45] Jan. 21, 1975

[54] SENSING SYSTEM FOR BAR PATTERNS

[75] Inventor: Elihu Craig Thomson, Wellesley, Mass.

[73] Assignee: Electronics Corporation of America, Cambridge, Mass.

[22] Filed: Mar. 31, 1972

[21] Appl. No.: 240,147

[52] U.S. Cl.... 235/61.11 E, 209/111.7, 250/219 D, 235/61.12 N

[51] Int. Cl. ............................................. G06k 7/10

[58] Field of Search.........235/61.11 R, 61.11 D, 235/61.11 E, 61.12 N, 61.12 M; 340/146.3 C, 146.3 Z, 347 DD; 209/111.5, 111.6, 111.7, 111.8; 250/219 D

[56] References Cited

UNITED STATES PATENTS

| | | | |
|---|---|---|---|
| 2,612,994 | 10/1952 | Woodland et al. | 235/61.11 E |
| 2,700,155 | 1/1955 | Clayden | 340/347 DD |
| 3,272,969 | 9/1966 | Cutaia | 235/61.11 D |
| 3,316,392 | 4/1967 | Bailey et al. | 340/146.3 K |
| 3,518,440 | 6/1970 | Hanson et al. | 235/61.11 E |
| 3,562,494 | 2/1971 | Schmidt | 235/61.12 N |
| 3,622,758 | 11/1971 | Schanne | 235/61.12 UX |
| 3,643,068 | 2/1972 | Mohan et al. | 235/61.12 N X |
| 3,676,645 | 7/1972 | Fickenscher et al. | 235/61.11 E |
| 3,701,097 | 10/1972 | Wolff | 235/61.12 N X |
| 3,701,886 | 10/1972 | Jones | 235/61.11 E |
| 3,731,064 | 5/1973 | Berler et al. | 235/61.11 E |
| 3,735,096 | 5/1973 | Knockeart et al. | 235/61.11 E |

*Primary Examiner*—Thomas J. Sloyan

[57] ABSTRACT

A code sensing system includes scanning means for producing electrical signals corresponding to code marks in a row. The value of the code mark is determined by its position in its digit space in the row. A code sampling gate is generated at a particular point in each digit space and a data output is produced if the scanning means is producing a code mark output at that time.

3 Claims, 6 Drawing Figures

Patented Jan. 21, 1975 3,862,400

3 Sheets-Sheet 2

SENSING SYSTEM FOR BAR PATTERNS

SUMMARY OF INVENTION

This invention relates to sensing systems and more particularly to article scanning systems and articles for use with such systems, for example systems of the type that may be used for article identification in an automatic sortation system or the like.

In an article sortation system, for example of the type sorting cartons on a conveyor system, the nature of the contents of each carton may be indicated by a code defined, for example by a set of code marks on the side of the carton. A sensing station adjacent the conveyor senses the code as the carton passes the sensing station and its output operates components of the sortation system to transfer the carton to a particular location as a function of the code on the carton. A variety of code configurations have been used for this purpose, among them a code arranged in two or more lines, the length of each line being a function of the number of digits in the code and each line indicating a different digit value; and a single line code in which each code element indicates a digit value and the digit value is determined by the width of the code element, for example a code element representing a binary one has twice the width of a code element representing a binary zero. Each of these code configurations require two or more scanners, the first code configuration requiring a scanner for each line and the second code configuration requiring a plurality of scanners for decoding the marks. The latter configuration also requires a longer total code length due to the several different widths of the code marks and the necessity to provide sufficient separation to differentiate between adjacent code marks.

It is an object of this invention to provide a novel and improved sensing system responsive to a simple code configuration.

Another object of the invention is to provide a novel and improved article having a machine readable code thereon.

Another object of the invention is to provide a novel and improved sensing system employing a single scanner.

Still another object of the invention is to provide a novel and improved article for use in a scanning system that employs a single scanner.

Still another object of the invention is to provide a novel and improved article sortation system.

In accordance with one aspect of the invention, there is provided sensing apparatus for use with an article having a series of code marks thereon. The sensing apparatus includes scanning means for producing electrical signals corresponding to code marks in a code on the article as the code is scanned along a path corresponding to the disposition of the code marks on the article, means for generating a code-sampling gate at a particular position in each digit space of the code, and means for producing an output in response to an electrical signal corresponding to a code mark produced by the scanning means during the code-sampling gate. In a particular embodiment a binary code is used and the code-sampling gate generation means generates a first gate in the lefthand portion of each digit space and a second gate in the righthand portion of each digit space, and the apparatus further includes means for producing an output representing one binary digit when the first gate is coincident with the production by the scanning means of an electrical signal corresponding to a code mark, and a different output representing the other binary digit when the second gate is coincident with the production by the scanning means of an electrical signal corresponding to a code mark. The code-sampling gate generating means includes a timer that produces an output representing the code-sampling gate, and means responsive to the production by the scanning means of an electrical signal corresponding to a first mark to cause the timer to initiate a first timing interval and responsive to the production by the scanning means of an electrical signal corresponding to each subsequent code mark to cause the timer to initiate another timing interval.

An article for use with such sensing apparatus comprises a sheet of material having at least one generally straight edge that provides a reference for guiding relative movement between the sheet and cooperating sensing apparatus along a path parallel to the straight edge. A series of code mark receiving locations are disposed in a single row that extends parallel to the straight edge of the sheet, each code mark receiving location defining a digit space having a plurality of positions in which a code mark can be placed. One and only one code mark detectable by the cooperating sensing apparatus is in each digit space, and the position of each code mark in its digit space in the direction parallel to the straight edge defines the value of the digit of that digit space. In preferred embodiments, the code marks and the sheet of material are of contrastingly different colors, each code mark is an elongated printed indicium, the length dimension of the code mark being greater than twice the width dimension of the code mark and the length dimension being disposed perpendicular to the straight edge, and the code marks in the series of digit spaces define a binary code, the width dimension of each code mark being one-half the width dimension of the digit space. This provides a compact binary coded single line arrangement readable by a single scanner.

Sensing systems in accordance with the invention thus are responsive to a relative position code in which a series of contiguous digit spaces are defined and a code mark is disposed in each digit space, the position of the code mark in the digit space defining the value of the digit in that space. In particular embodiments, a binary code is employed with a binary ONE occupying the left half of the digit space and a binary ZERO occupying the right half of the digit space. Each code bar is an elongated member having a length at least three times its width and the code bars are disposed with their lengths parallel to one another with the series of code bars extending in a direction transverse to the lengths of the code bars. These code bars are applied to labels in a rapid and coordinate manner by a "ticket" type of printer. The code arrangement thus is readily applied to articles and may be read by a single scanner in a system that is tolerant of variations in the distance of the label from the scanner (depth offset) and the angle at which the label is presented to the scanner, the system accommodating significant amounts of both vertical skew and horizontal skew, for example, of the articles.

In a particular embodiment, as the scanner scans the code bars on the article, it produces an output signal that differentiates between the sensed absence of a code bar (the white label background) and the black code bar. The series of code bars are sensed sequentially by relative movement of the scanner and while the code may be sensed either by moving the scanner past the code or the code past the scanner, in that embodiment the code is moved past a fixed scanner station. Logic in the system starts a timer in response to the detection of a control bar (the first bar purposely being located in the ONE position) and at the end of a predetermined time interval, the sensor output is sampled and a signal recorded as a function of whether or not a sensed code bar signal is being generated by the scanner. The next timing interval is a function of the detected output value, for example if a binary ONE value was sensed, a first timing interval will be initiated while if a binary ZERO value was sensed, a second shorter timing interval will be initiated to check anew for the detection of a code bar in the digit (bit) space. Thus, in each bit interval, when the digit is sensed, the timing interval relating to the next bit space is updated as a function of the sensed data.

The invention provides a reliable sensing system responsive to a simple data code which is particularly useful in an article sortation system or the like. Other objects, features and advantages of the invention will be seen as the following description of a particular embodiment progresses, in conjunction with the drawings, in which.

DESCRIPTION OF PARTICULAR EMBODIMENTS

Figure 1:
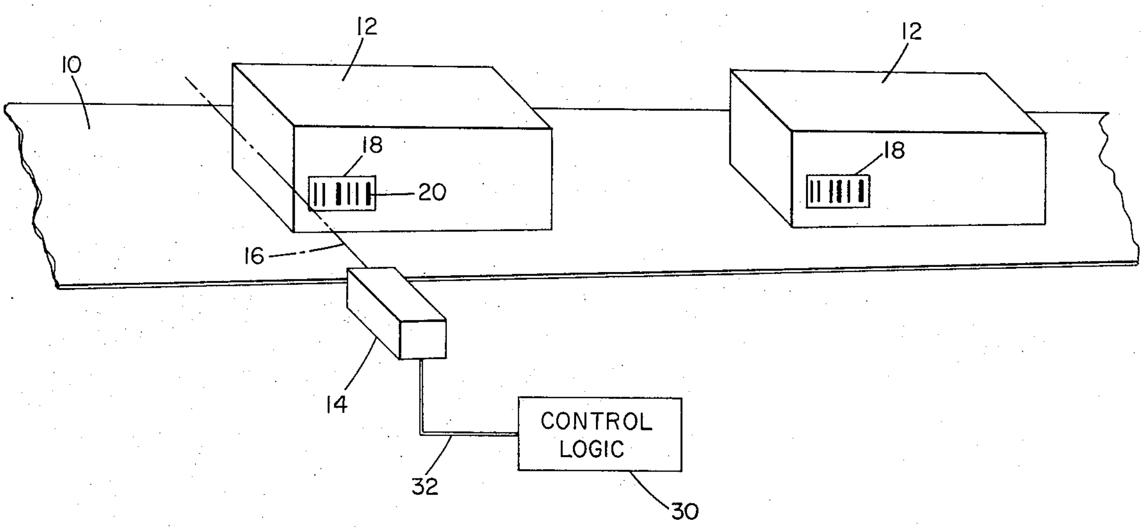
FIG. 1 is a diagrammatic view of a conveyor and components of a control system in accordance with the invention.

With reference to FIG. 1 there is shown a conveyor 10 on which is supported a series of cartons 12 for movement past a scanner station 14 that senses along path 16. Each carton 12 has a label 18 located on the side wall of the carton that bears a series of bars 20.

Figure 2:
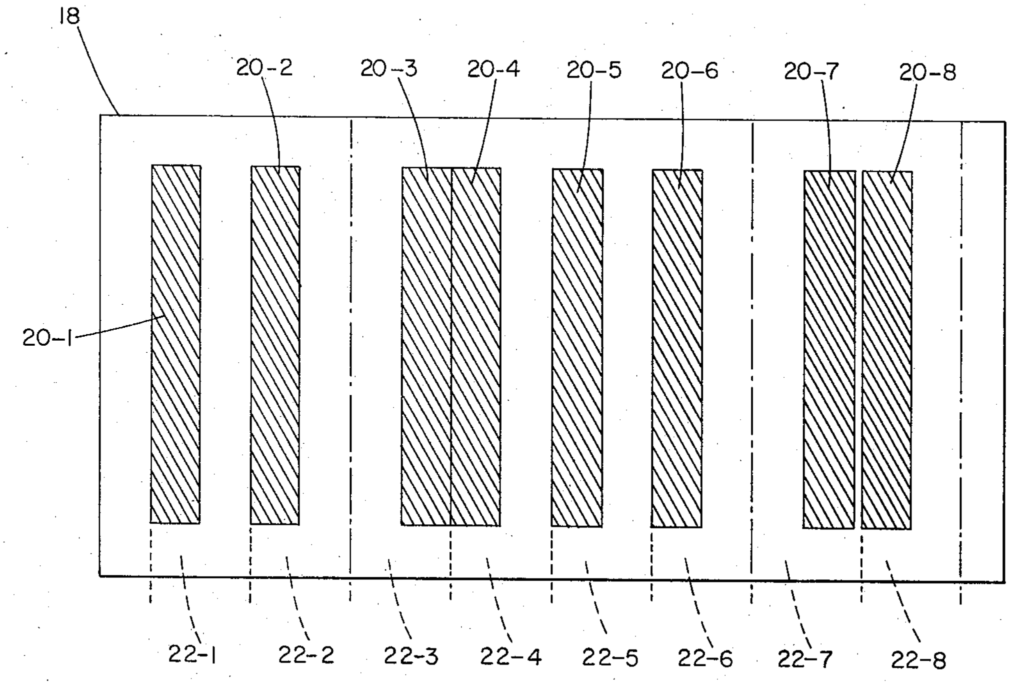
FIG. 2 is a diagram of a code arrangement on a label employed in the practice of the invention.

Additional details of the code configuration may be seen with reference to the diagram of FIG. 2. The code is based on a series of digit spaces 22, there being eight digit spaces in the arrangement shown in FIG. 2. Each digit space is divided into a lefthand half and a righthand half, as binary coding is employed in this embodiment. A control or reference bar 20-1 disposed in the lefthand half of space 22-1; and a data code bar 20-2 – 20-8 is disposed in each corresponding digit space 22-2 – 22-8. In this code arrangement, if the data code bar is in the left half of the digit space, it is considered a binary ONE, while if it is in the right half of the digit space, it is considered a binary ZERO. Thus the code represented by the label shown in FIG. 2 is 1011101. While these code bars may be generated by various techniques, in a particular embodiment the serial code pattern is printed on the label 18 by a printer, which forms a code bar that is 0.050 inch wide and 0.750 inch long. Each digit space 22 has a width of 0.1 inch. The control and code information, in a particular application, is applied to the label 18 by a "ticket printer" which applies a series of code bars to each label in an on-line system at a rate of 40 labels per minute. Each "ONE" code bar character is offset to the lefthand half of the digit space and each "ZERO" code bar character is offset to the righthand half of the digit space.

Figure 3:
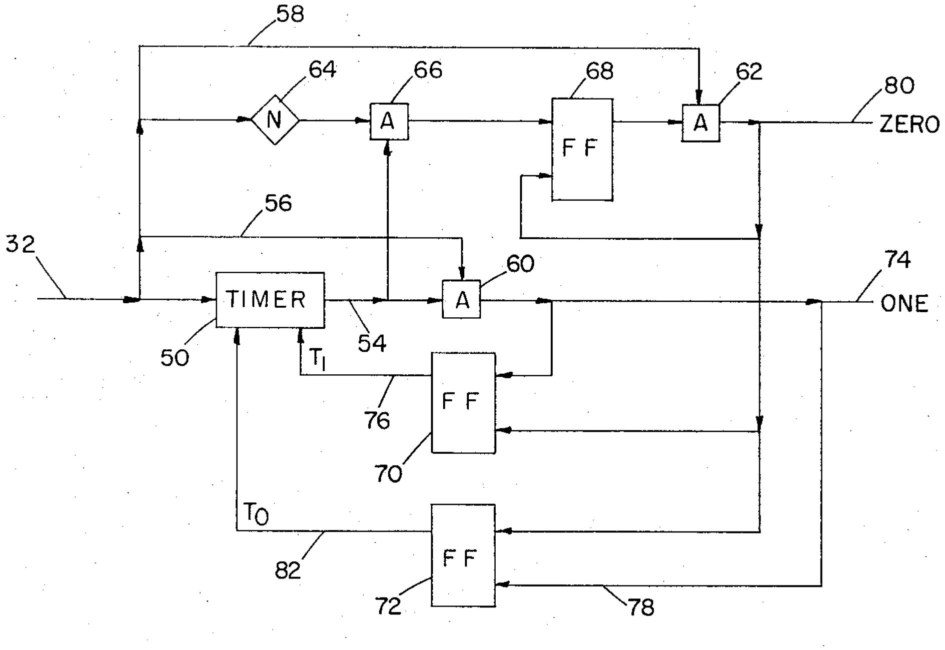
FIG. 3 is a block diagram of control logic responsive to output signals of scanner 14.

A block diagram of circuitry 30 responsive to scanner 14 is shown in FIG. 3. That circuitry includes a timer 50 that in response to an input signal on line 32 provides an output signal on line 54 after a first predetermined interval of time ($T_0$) or a second predetermined interval of time ($T_1$). The input signal on line 32 is applied also over lines 56 and 58 to AND circuits 60 and 62, respectively; and through inverter 64 to remove a conditioning level from AND circuit 66. The circuitry also includes three flip flops 68, 70 and 72.

If timer 50 produces an output pulse on line 54, while a scanner signal is on line 32, AND circuit 60 will produce a pulse on line 74. That output also sets flip flop 70 to provide an output signal on line 76 which resets the timer to its $T_1$ timing cycle. If there is no signal on line 32 when the timer output pulse on line 54 occurs, the pulse is passed by conditioned AND circuit 66 to set flip flop 68, thus conditioning AND circuit 62. When a scanner signal finally does appear on line 32, that transition is applied over line 58 and passed by conditioned AND circuit 62 as an output on line 80. The output resets flip flops 68 and 70, and sets flip flop 72. When flip flop 68 is reset, it deconditions AND circuit 62 so that output 80 returns to ZERO and thus output 80 becomes a pulse. The setting of flip flop 72 produces an output on line 82 which sets the timer 50 to its $T_0$ timing interval. The $T_0$ and $T_1$ timing intervals are a function of the scanning speed, e.g., that of the conveyor, and if the conveyor speed is variable, the timing intervals may be correspondingly changed, either manually or automatically (the time width of each digit interval 22 decreases as the conveyor speed increases).

Figure 4:
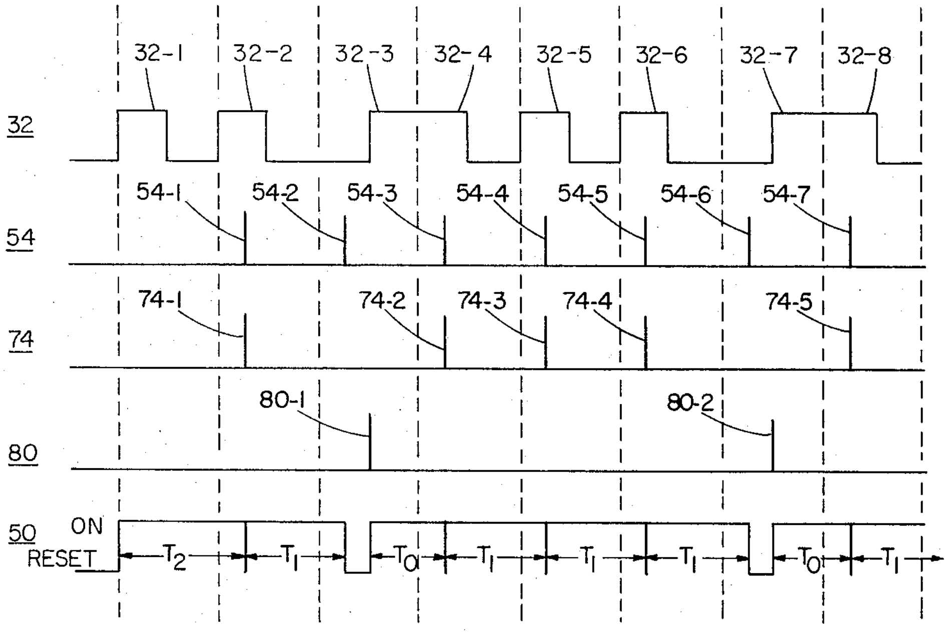
FIG. 4 is a timing diagram indicating a sequence of operations of the logic shown in FIG. 3.

The wave form output from the scanner circuit 14 which is applied to the timing circuitry 30 over line 32 in response to the scanning of the label shown in FIG. 2 is indicated in the diagram of FIG. 4. Signal 32-1 is an initializing pulse signal responsive to control bar 20-1 which is purposely placed in the position of a ONE and starts timer 50 in initializing mode $T_2$. At the end of the initializing interval (time $T_2$) a pulse 54-1 appears on line 54. As data signal 32-2 responsive to code bar 20-2 is present, AND circuit 60 has an output and a pulse 74-1 is applied as a ONE on line 74. That output pulse sets $T_1$ control flip flop 70 to reset timer 50 to the $T_1$ timing interval and maintains $T_0$ control flip flop 72 in the reset state. Since there is an enabling input 32 to the timer, the resetting input from 76 will also start the time interval $T_1$. At the end of the $T_1$ timing interval, timer 50 has pulse output 54-2 which samples AND circuits 60 and 66. As no data signal is present, AND circuit 60 is not conditioned, but AND circuit 66 is conditioned. Therefore flip flop 68 is set, conditioning AND circuit 62. The next data signal 32-3 applies a transition over line 58 which is passed by the conditioned AND circuit 62 to produce a ZERO or check output 80-1 on line 80. Output 80-1 also resets flip flop 68 which limits output 80 to a pulse, resets flip flop 70 and sets $T_0$ control flip flop 72 whose output sets and starts timer 50 for a $T_0$ (three-quarter digit interval) timing cycle. At the end of $T_0$, output (54-3) samples code signal line 32 and as there is a code signal level (34-4) present, AND circuit 60 produces an output 74-2 on line 74, flip flop 70 is set and flip flop 72 is reset. The set flip flop 70 in conjunction with input 32-4 initiates a $T_1$ timing cycle which produces sampling signal 54-4. As data signal 32-5 is present, AND circuit 60 produce output 74-3 on line 74 and another $T_1$ (full digit interval) timing cycle is initiated. The $T_1$ sequence is again repeated in response to sampling pulse 54-5 as data signal 32-6 is present and data indicator pulse 74-4 is generated. In response to sampling pulse 54-6, however, no data pulse is present on line 32 and flip flop 68 is set. Data signal 32-7 produces an output 80-2 on line 80 and initiates a $T_0$ timing cycle. The resulting sampling pulse 54-7 senses the existence of data signal 32-8 and produces the ONE output 74-5 on lines 74. It will be noted that the series of ONE and ZERO data indicator signals on lines 74 and 80 represent 1011101—the code on the label of FIG. 2. After the initializing interval, the $T_1$ interval is initiated by the coincidence of the detection of a code bar and the expiration of a timed interval, while the $T_0$ interval is initated solely by the detection of a code bar after the expiration of a timed interval. Initiation of the $T_1$ interval represents the detection of a ONE, while initiation of the $T_0$ represents the detection of a ZERO.

Figure 5:
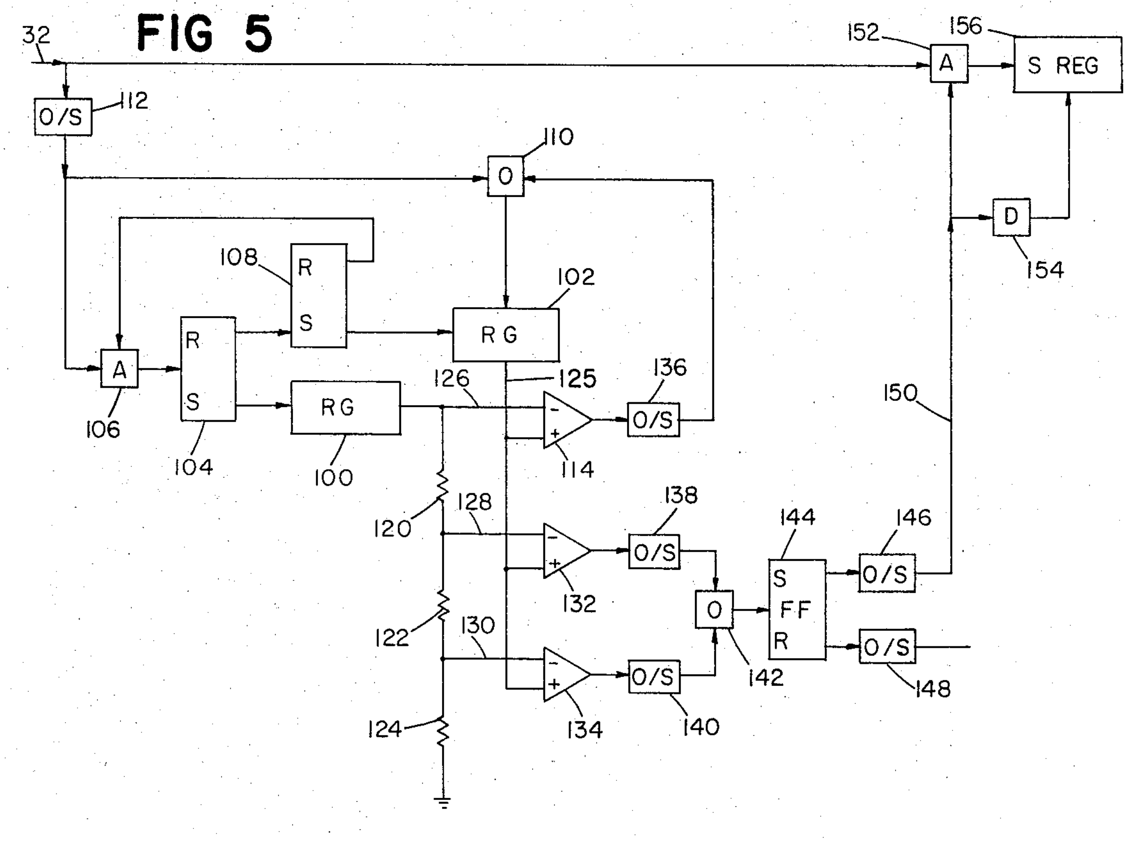
FIG. 5 is a block diagram of another form of control logic responsive to output signals of scanner 14.

A second embodiment of code reader logic is shown in FIG. 5. That logic includes a first (digit interval defining) ramp generator 100 and a second (cycling) ramp generator 102. Ramp generator 100 is started by the set output of flip flop 104 which is triggered by a signal from AND circuit 106. The second ramp generator 102 is conditioned by the set output of flip flop 108 which is set when flip flop 104 is switched from set to reset state. Ramp generator 102 is reset by an output of OR circuit 110 which has an input from either one shot 112 or comparator amplifier 114. Flip flop 108 in reset state applies a conditioning level to AND circuit 106.

The output of ramp generator 100 is fed to a voltage divider network that includes resistors 120, 122 and 124 and provides outputs on lines 126, 128 and 130. The values of resistors 120, 122 and 124 are selected so that the output voltage on line 128 is 75 percent of the voltage on line 126 and the output voltage on line 130 is 25 percent of the voltage on line 126. The voltage on line 126 defines the digit space, the voltage on line 128 defines a three-fourths digit space point, and the voltage on line 130 defines a one-fourth digit space point. These voltages are applied to comparator amplifiers 114, 132 and 134, respectively. The other input to each comparator amplifier is from the output of ramp generator 102. The output of comparator amplifier 114 (at the end of each digit space) is applied through one shot 136 to OR circuit 110 while the output of comparator amplifier 132 (at the three-fourths point in each digit space) and the output of comparator amplifier 134 (at the one-fourth point in each digit space) are applied through one shots 138, 140, respectively, to OR circuit 142 and its output in turn is applied to the toggle input of flip flop 144. Connected to the set output of flip flop 144 is one shot 146 and connected to the reset output is one shot 148. The output of one shot 146 is applied over line 150 to condition AND circuit 152 and through delay circuit 154 to the shift input of shift register 156. The output of AND circuit 152 is applied to the data input of shift register 156. The output of one shot 148 may be used for check purposes or otherwise as desired.

The system shown in FIG. 5 detects the leading edge of a code bar at the beginning of a digit space and actuates cycling logic (including ramp generator 102) which includes logic to produce a first sampling pulse at the one-quarter point digit space position and a second sampling pulse at the three-quarter digit space position. If a code bar signal is present coincident with the first sampling pulse, a one will be entered in the shift register. After the first one, the cycling logic recycles and produces sampling pulses at the proper times in each digit space.

In order to relate the cycling logic to the actual digit space dimensions, its timing interval is set by digit space logic in response to the first two sensed (control) bars, the first sensed control bar starting a digit space logic timer (ramp generator 100) and the second sensed control bar stopping that timer so that it produces an output which is used to define the digit space.

In the system shown in FIG. 5, electrical data signals approximately one-half digit space in width are received on line 32. When the first data signal appears, its leading edge triggers one shot 112 and the resulting pulse is passed by conditioned AND circuit 106 to set flip flop 104, and by OR circuit 110 to reset cycle logic ramp generator 102. The set output of flip flop 104 conditions space logic ramp generator 100 which starts to generate an output ramp voltage on line 126. When the second data signal is received on line 32, one shot 112 produces an output pulse which is passed by AND circuit 106 to complement flip flop 104. That operation removes the conditioning input to ramp generator 100, stopping that ramp generator and establishing a reference (digit space defining) voltage on line 126. At the same time, flip flop 104 produces an output which sets flip flop 108, removing the conditioning input from AND circuit 106 and enabling cycle logic ramp generator 102. Thus the digit space logic timer is disabled so that the reference signal on line 126 is established and the cycle logic timer 102 is enabled.

The distance between the first two control signals is related to the ramp rates of timers 100 and 102. Where the distance between the two control signals corresponds to three data spaces, the ramp rate of generator 102 is three times the ramp rate of generator 100 so that the voltage output of ramp generator 102 (on line 125) will equal the voltage output of ramp generator 100 (on line 126) in one data space.

The rising voltage on line 125 first causes comparator 134 to trigger one shot 140 at the one-fourth digit space point; causes comparator 132 to trigger one shot 138 at the three-fourths point; and causes comparator 114 to trigger one shot 136 at the full digit space point. The outputs of one shots 138 and 140 are applied to the toggle input of flip flop 144 and the output of one shot 136 is applied through OR circuit 110 to reset ramp generator 102.

It will be seen that ramp generator 102 can be reset by the leading edge of a data signal on line 32 or by the expiration of a digit space time interval represented by the voltage on line 125 reaching the voltage on line 126. Thus the ramp generator 102 is reset at least every digit space and is reset within a digit space in response to the leading edge of a data signal, thus, in effect, updating the cycle logic in response to each data signal.

Figure 6:
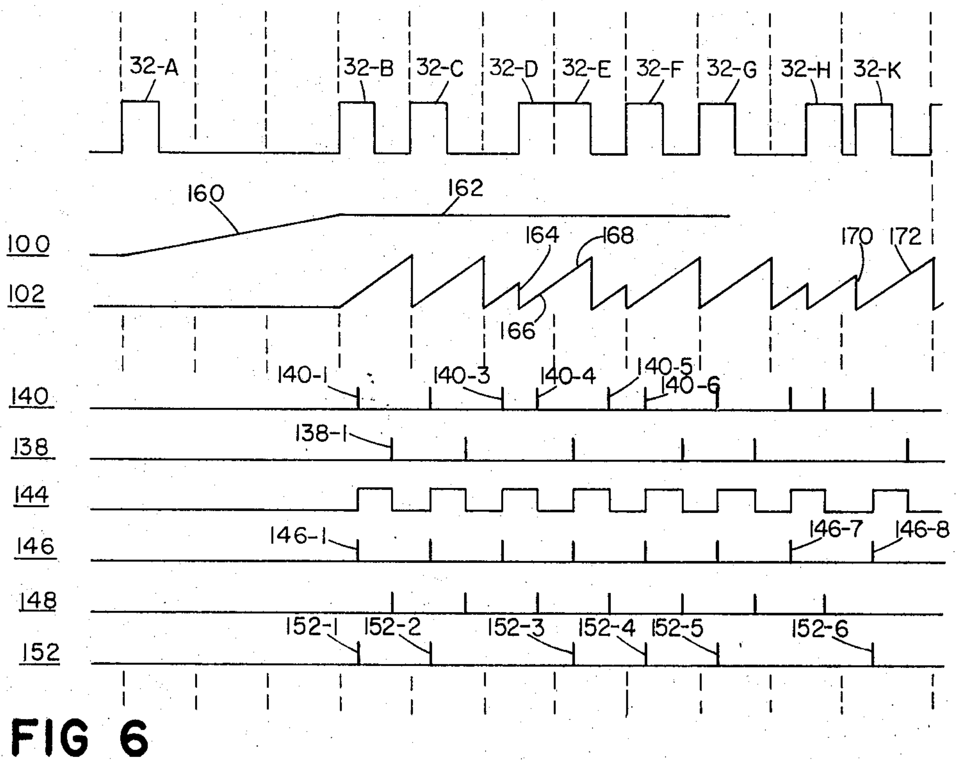
FIG. 6 is aa timing diagram indicating a sequence of operations of the logic shown in FIG. 5.

Further understanding of the operation of this circuitry may be had with reference to the timing diagram of FIG. 6 which indicates a scanning cycle of a code of the type indicated on the label of FIG. 2 with the provision of an additional control bar spaced three digit intervals in advance of initializing control bar 20-1. Initially, flip flops 104, 108 and 144 are reset. The initial (control) signal 32A from scanner 14 on line 32 is passed by AND circuit 106 to set flip flop 104, releasing ramp generator 100. Pulse 32A is also applied to AND circuit 152 but is not passed as that AND circuit is not conditioned and is applied to one shot 112 whose output is applied via OR circuit 110 to the reset input of ramp generator 102. Ramp generator 102 does not start as ramp generator control flip flop 108 is not set. The voltage output of ramp generator 100 increases as indicated by line 160 until the second (initializing) signal 32B from scanner 14 is produced. Signal 32B is passed by conditioned AND circuit 106 to reset flip flop 104. Resetting of flip flop 104 stops ramp generator 100 so that the digit space defining voltage level 162 is established on line 126. This reference voltage level is a function of the effective spacing between the leading edges of signals 32A and 32B (produced by two corresponding control marks on the label being sensed) in terms of the speed of the label 18 being sensed past the scanner 14. Voltage level 162 on line 126 thus defines the full digit interval, the voltage on line 128 defines the three-fourths point of that digit interval, and the voltage on line 130 defines the one-fourth point of the digit interval. The resetting of flip flop 104 sets flip flop 108, removing a conditioning level from AND circuit 106 and starting ramp generator 102 to commence a digit interval timing cycle. The output voltage of ramp generator 102 is applied over line 125 to the comparator amplifiers 114, 132 and 134. When that voltage on line 125 is 25 percent of level 154, a pulse 134-1 is produced from comparator amplifier 134 and one shot 140 and passed through OR circuit 142 to toggle flip flop 144, producing an output 140-1 from one shot 140 which is applied over line 150 to sample AND circuit 152. As the signal 32B is present, AND circuit 152 has an output 152-1 which is applied to the input of shift register 156. The strobe signal on line 156 is also passed by delay circuit 154 to step shift register 156 so that the signal 152-1 from AND circuit 152 is loaded into the first stage of the shift register 156 in a data recording operation.

When the output of ramp generator 102 reaches the 75 percent point, one shot 138 has an output 138-1 which is passed by OR circuit 142 to toggle flip flop 144, causing one shot 148 to produce an output pulse 148-1 which may be used for error checking or other suitable purposes. When the output of ramp generator 102 equals the output of ramp generator 100 (level 162) one shot 136 produces an output which is passed by OR circuit 110 to reset the ramp generator 102 and end the digit space cycle.

The same digit space cycle is repeated. As data signal 32C occurs in the first half of the digit interval and thus represents a ONE value, signal 152-2 is loaded into shift register 156. In the next digit interval, the data signal 32D is in the second half of the digit interval. When ramp generator 102 output reaches the 25 percent point, one shot 140 produces an output 140-3 which toggles flip flop 144 to cause one shot 146 to produce an output which samples gate 152. As no input level is present on line 32, no signal is passed by AND circuit 152 but a shift pulse is applied to the shift register 156, effectively recording a ZERO in the shift register 156. The leading edge of data signal 32D in the second half of the digit interval triggers one shot 112 to produce an output which is passed by OR circuit 110 to reset ramp generator 102 as indicated at 164. When ramp generator 102 reaches the 25 percent point (point 166), output 140-4 is provided by one shot 140 which toggles flip flop 144, triggering one shot 148. At the 75 percent point (point 168), one shot 138 produces an output which toggles flip flop 144 and produces an output from one shot 146 to sample AND circuit 152. As AND circuit is conditioned by signal level 32E, the pulse 152-3 is passed and loaded into the shift register as a ONE value.

The output of comparator 114 resets ramp generator 102. (It will be notet that signals 32D and 32E are adjacent one another so that there is no discernable leading edge of signal 32E).

At the next 25 percent point, one shot 140 produces output 140-5 toggling flip flop 144 to cause one shot 148 to produce an output. The leading edge of signal 32F in the next digit interval resets ramp generator 102 and at the next 25 percent point, one shot 140 produces output 140-6 which toggles flip flop 144 and causes one shot 146 to produce an output for sampling AND circuit 152. As there level 32F is present on line 32, AND circuit 152 has an output 152-4 which is entered as a ONE into the shift register. The output of one shot 138 at the 75 percent point toggles flip flop 144 again and causes one shot 148 to produce an output. The output of one shot 136 resets ramp generator 102. (If the leading edge of any date signal, e.g., signal 52G is offset in time from the output of one shot 136, a second reset pulse will be passed by OR circuit 110 thus providing an update of the digit interval defined by the output of ramp generator 102.) Again at the 25 percent point, one shot 146 has an output which samples the conditioned AND circuit 152 and signal 152-5 is passed to load a ONE indication into the shift register. In the next digit interval, no data signal is present when one shot 146 produces output 146-7 and therefore a ZERO is recorded in shift register 156. Ramp generator 102 is reset at point 170 by the leading edge of pulse 32H in the second half of the digit interval.

It will be noted that in this example, the signal 32K is spaced from signal 32H so that there is a leading edge transition even though the ZERO and ONE code marks are adjacent. In this event, ramp generator 102 is reset by the leading edge of signal 32K at point 172 and at the 25 percent mark, the flip flop 144 is toggled to cause one shot 146 to produce sampling pulse 146-8. As there is a level present on line 32, signal 152-6 is passed from OR circuit 152 to load a ONE into the shift register 156. At this time, the code (1011101) on the label has been recorded in the shift register and the overflow signal produced by the recorded 32B signal terminates the code reading cycle.

Thus it will be seen that the invention provides articles having simple compact code arrangements and cooperating scanning apparatus. While particular embodiments of the invention have been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. Sensing apparatus for use with an article comprising scanning means for producing electrical signals corresponding to code marks in a code on an article as the code is scanned along a path corresponding to the disposition of said code marks, said code defining a series of equal width code mark receiving locations disposed in a single row, each said code mark receiving location defining a digit space and having two positions within said digit space in which a code mark can be placed, said code being of the binary type in which a code mark representing one binary digit is disposed in the lefthand half of the digit space and a code mark representing the other binary digit is disposed in the righthand half of the digit space and one and only one code mark detectable by said sensing apparatus is in each said digit space, said code marks being of equal width and the position of each said code mark in its digit space defining the value of the digit of that digit space, circuitry for selectively generating a signal corresponding to the time duration of a digit space interval, the time durations of said digit space intervals in said series being equal to one another, means for generating a code-sampling gate at the position in each said digit space interval of a mark representing one of said two digits, and means responsive to a code mark signal produced by said scanning means coincident with said one digit code-sampling gate for producing a first output and establishing a first timing interval corresponding to said digit space interval, and responsive to the absence of a code mark signal coincident with said one digit code-sampling gate for establishing a second timing interval different from said first timing interval in response to a scanner signal corresponding to the start of the other binary digit whereby a code-sampling gate is generated at the same point in each digit space to facilitate reading of the code on the article.

2. The apparatus as claimed in claim 1 wherein said digit space interval time duration signal generating means includes means responsive to two consecutive control marks on said article for adjusting the time duration of the interval corresponding to a digit space.

3. The apparatus as claimed in claim 2 and further including means responsive to the second of said two consecutive control marks to enable said code-sampling gate generating means.

* * * * *